United States Patent
Mori et al.

(10) Patent No.: US 7,787,574 B2
(45) Date of Patent: Aug. 31, 2010

(54) RECEPTION TERMINAL APPARATUS

(75) Inventors: Kohei Mori, Kanagawa (JP); Takahiro Okada, Saitama (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 11/472,461

(22) Filed: Jun. 22, 2006

(65) Prior Publication Data

US 2006/0293015 A1 Dec. 28, 2006

(30) Foreign Application Priority Data

Jun. 23, 2005 (JP) ............................ P2005-183952
Jul. 7, 2005 (JP) ............................ P2005-199323

(51) Int. Cl.
*H04B 7/10* (2006.01)
(52) U.S. Cl. ...................................................... 375/347
(58) Field of Classification Search ................. 375/147, 375/267, 317, 316, 240, 319, 350, 260, 347; 370/280, 310.1, 208; 455/550.1, 575.1, 575.7
See application file for complete search history.

(56) References Cited

U.S. PATENT DOCUMENTS

2005/0009586 A1\* 1/2005 Mori ........................ 455/575.7

2005/0123083 A1\* 6/2005 Kawakami .................. 375/347

FOREIGN PATENT DOCUMENTS

JP 2005-33410 2/2005

\* cited by examiner

*Primary Examiner*—David C Payne
*Assistant Examiner*—Syed Haider
(74) *Attorney, Agent, or Firm*—Finnegan, Henderson, Farabow, Garrett and Dunner, L.L.P.

(57) ABSTRACT

The present invention provides a reception terminal apparatus that can receive signals in a stable state with a simple configuration and hence is highly suitable for mobile reception. The reception terminal apparatus includes an input section that selectively inputs a reception signal from reception signals of a plurality of types in different states of reception, a demodulation section that demodulates the reception signal input by the input section, an error detection section that detects errors in the stream data obtained by the demodulation section by demodulating the reception signal, and a control section that determines if the number of errors as detected by the error detection section exceeds a threshold value or not and controls the input section according to the outcome of determination, the reception signal to be input to the demodulation section by the input section being switched when the number of errors exceeds the threshold value.

15 Claims, 15 Drawing Sheets

RECEPTION TERMINAL APPARATUS

CROSS REFERENCES TO RELATED APPLICATIONS

The present invention contains subject matter related to Japanese Patent Application JP2005-183952 filed in the Japanese Patent Office on Jun. 23, 2005 and Japanese Patent Application JP2005-199323 filed in the Japanese Patent Office on Jul. 7, 2005, the entire contents of which being incorporated herein by reference.

BACKGROUND OF THE INVENTION

1. Field of the Invention

This invention relates to a reception terminal apparatus that is highly suitable for mobile reception.

2. Description of the Related Art

For mobile reception, it is indispensable to suppress interference waves that are generated by reflections and diffractions. Diversity reception is known as a technique for suppressing interference waves.

In the case of digital transmissions by way of wireless LANs, transmission and reception of signals are realized by finding an antenna showing a high signal level within a predetermined period of time and, when there are missing data, it is possible to retransmit the data.

Referring to FIG. 1 of the accompanying drawings, a diversity reception process of arranging a plurality of antennas 111A, 111B and switching the operation of signal reception at high speed by means of an antenna switch 112 to select the antenna showing a higher electric field level is being popularly employed. The reception signal received by way of the antenna selected by the antenna switch 112 is subjected to frequency conversion by means of a frequency converter 113 and demodulated by means of a demodulator 114 (see, for example, Patent Document 1: Jpn. Pat. Appln. Laid-Open Publication No. 2005-33410).

SUMMARY OF THE INVENTION

However, the above-described signal reception process is effective only when the signal transmission/reception system can use discontinuous signals such as analog signals for communication or retransmit data typically by way of wireless LANs. In other words, in the case of digital transmission that has to move back on time series to get data typically by means of an equalizer and hence does not accept any discontinuity of data or in the case of real time transmission that does not allow retransmission of data, signals that are received properly can give rise to an increased number of transmission errors when the antenna is switched at high speed to make the transmitted data discontinuous.

To reduce the number of transmission errors, there has been proposed a technique of subjecting the signals received by way of a plurality of antennas 211A, 211B to frequency conversion by means of respective frequency converters 212A, 212B, subsequently converting the signals into digital signals by means of respective analog/digital converters 213A, 213B and then weighting the different levels of the reception signals that have been converted into digital signals by means of a weight computing/processing section 214 before delivering them to a demodulator 215 as shown in FIG. 2. There has also been a technique of providing two systems including respective antennas 311A, 311B, frequency converters 312A, 312B, analog/digital converters 313A, 313B and demodulators 214A, 214B, in other words two systems for all the way from antennas to demodulators, and synthetically combining the two signals by means of a weight computing/processing section 215 after demodulation.

However, the above cited techniques use two or more than two systems that include frequency converters and demodulators, which by turn give rise to problems in terms of downsizing and power consumption rate particularly in the case of small terminals.

Besides, a reception technique of defining a threshold value in advance for the detected voltage of a signal and switching from an antenna to another as illustrated in the flowchart of FIG. 4 may be conceivable. Since a signal showing a higher signal level provides a low probability of turning to an error, this technique can be expected to improve the percentage of receiving correct signals. However, if the signal level is high, it is difficult to find out if the signal is in fact a noise or a distorted signal by relying only on the information obtained from the detected voltage. In other words, a transmission error can occur when the detected voltage (signal level) exceeds a threshold value. Additionally, the detected voltage can vary from a detector to another and it is not possible to unequivocally tell the detected voltage.

On the other hand, in the case of television receiving terminal, various different connection modes exist in terms of the antenna being used for signal input (coaxial cable, antenna terminal, etc.), the feeder line being connected directly or indirectly and so on. The signal level can also vary in various ways depending on the circumstances. When, for instance, an antenna is connected, the signal level can be low and vary depending on the type of the antenna and the place of installation. On the other hand, when a feeder line is connected, the signal level becomes very high and the amplifier may be distorted.

Additionally, there can be various different signal levels depending on the operating conditions and the frequency and hence it is difficult for any reception terminal to make itself adaptable to any environment.

Recently, there has been proposed a modulation system called orthogonal frequency division multiplexing (OFDM) as a technique for digital signal transmission. With the OFDM method, a large number of sub-carriers that are orthogonal relative to each other are provided in a transmission band and data are assigned to the amplitude and the phase of each sub-carrier for the purpose of digital modulation by means of PSK (phase shift keying) and QAM (quadrature amplitude modulation).

Standards such as DVB-T (digital video broadcasting-terrestrial) and ISDB-T (integrated service digital broadcasting-terrestrial) have been proposed for digital terrestrial television broadcasting that adopts the OFDM method.

With the OFDM method that uses QAM type modulation for each sub-carrier, the characteristics of the amplitude and those of the phase of each sub-carrier are differentiated when different distortions arise to the sub-carriers due to the influence of the multi-path or the like at the time of signal transmission. Thus, the signal receiving side has to equalize (correct) the waveform of the reception signal to make the amplitudes and the phases of the sub-carriers equal to each other. With the OFDM method, the signal transmitting side places a pilot signal of a predetermined amplitude and a predetermined phase in the transmission signal in a dispersed manner so that the signal receiving side estimates the characteristics of the transmission channel by monitoring the amplitude and the phase of the pilot signal and equalizes the reception signal according to the estimated characteristics of the transmission channel. The pilot signal to be used for estimating the characteristics of the transmission channel is referred to as scattered pilot signal (SP).

In view of the above-identified circumstances of the related art, it is desirable to provide a reception terminal apparatus that can receives signals in a stable state with a simple configuration and hence is highly suitable for mobile reception.

The advantages of the present invention will become apparent from the description of preferred embodiments of the invention given below by referring to the accompanying drawings.

A reception terminal apparatus according to an embodiment of the invention includes: an input means for selectively inputting a reception signal from reception signals of a plurality of types in different states of reception; a demodulation means for demodulating the reception signal input by the input means; an error detection means for detecting errors in the stream data obtained by the demodulation means by demodulating the reception signal; and a control means for determining if the number of errors as detected by the error detection means exceeds a threshold value or not and controlling the input means according to the outcome of determination; the reception signal to be input to the demodulation means by the input means being switched when the number of errors exceeds the threshold value.

According to an embodiment of the present invention, the control means determines if the number of errors detected by the error detection means that uses error correction codes such as Reed-Solomon codes for detecting errors in the stream data demodulated from the reception signal by the demodulation means exceeds a threshold value or not and, if the number of errors exceeds the threshold value, the reception signal to be input to the demodulation means from the input means can be switched. Thus, it is possible to reduce the number of times of switching the signal receiving antenna to be used for inputting the reception signal to the demodulation means and hence the number of discontinuity factors that give rise to problems in digital transmission.

According to an embodiment of the present invention, it is possible to realize a reception terminal apparatus that is highly suitable for mobile reception having a diversity reception feature for suppressing interference waves that are generated by reflections and diffractions by providing a plurality of antenna elements as plurality of input means.

Additionally, according to an embodiment of the present invention, it is possible to realize a reception terminal apparatus that is highly suitable for mobile reception and can receive signals in a stable state with a simple configuration by providing a plurality of circuit elements for changing the input characteristics of the reception signal as plurality of input means so as to change the input characteristics of the reception signal according to the operating environment.

DETAILED DESCRIPTION OF THE PREFERRED EMBODIMENTS

Now, the present invention will be described in greater detail by referring to the accompanying drawings that illustrate preferred embodiments of the invention. It will be appreciated that the present invention is by no means limited to the described embodiments, which may be modified and altered in various different ways without departing from the spirit and scope of the present invention.

Figure 1:
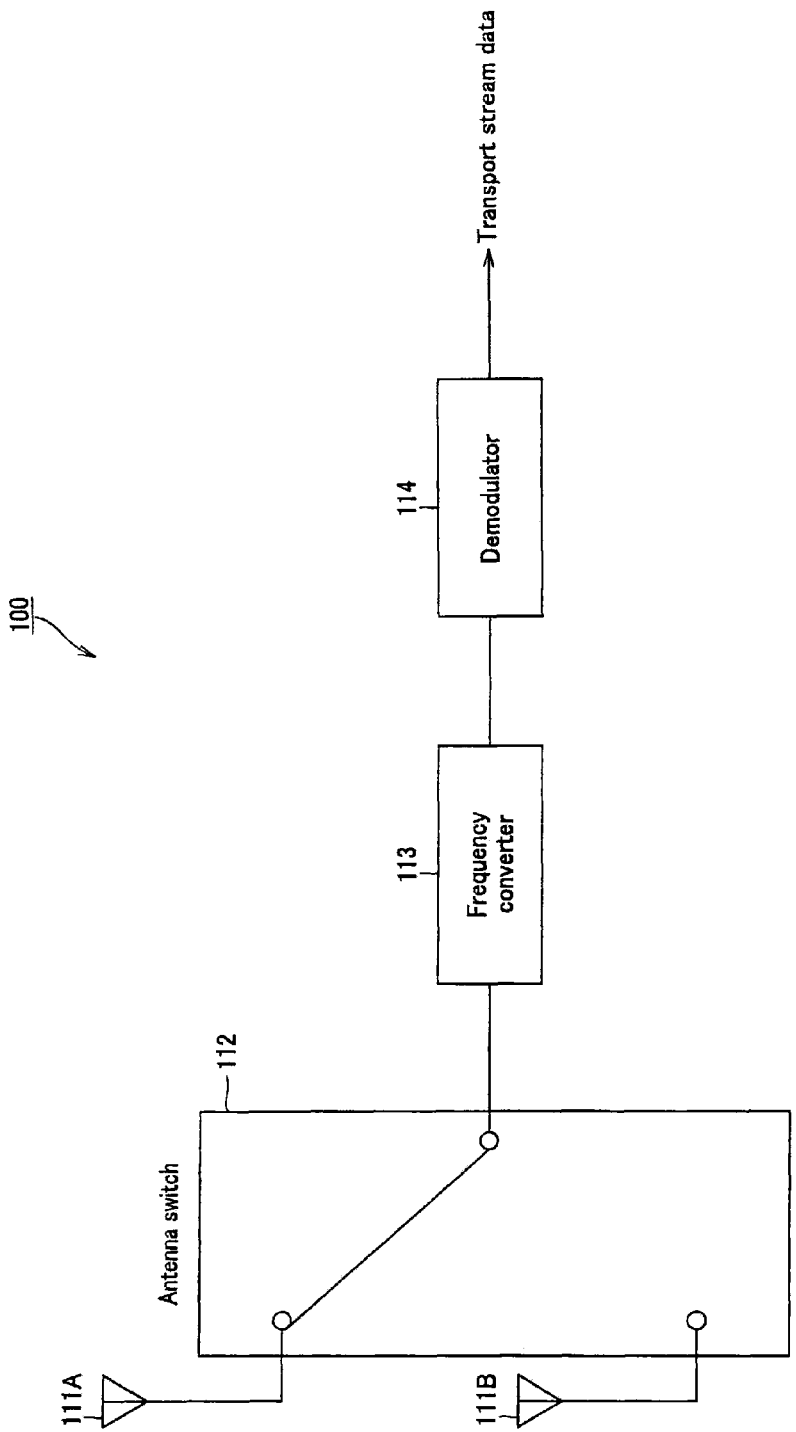
FIG. 1 is a schematic block diagram of a known reception apparatus, illustrating the principle of operation for diversity reception.
Figure 2:
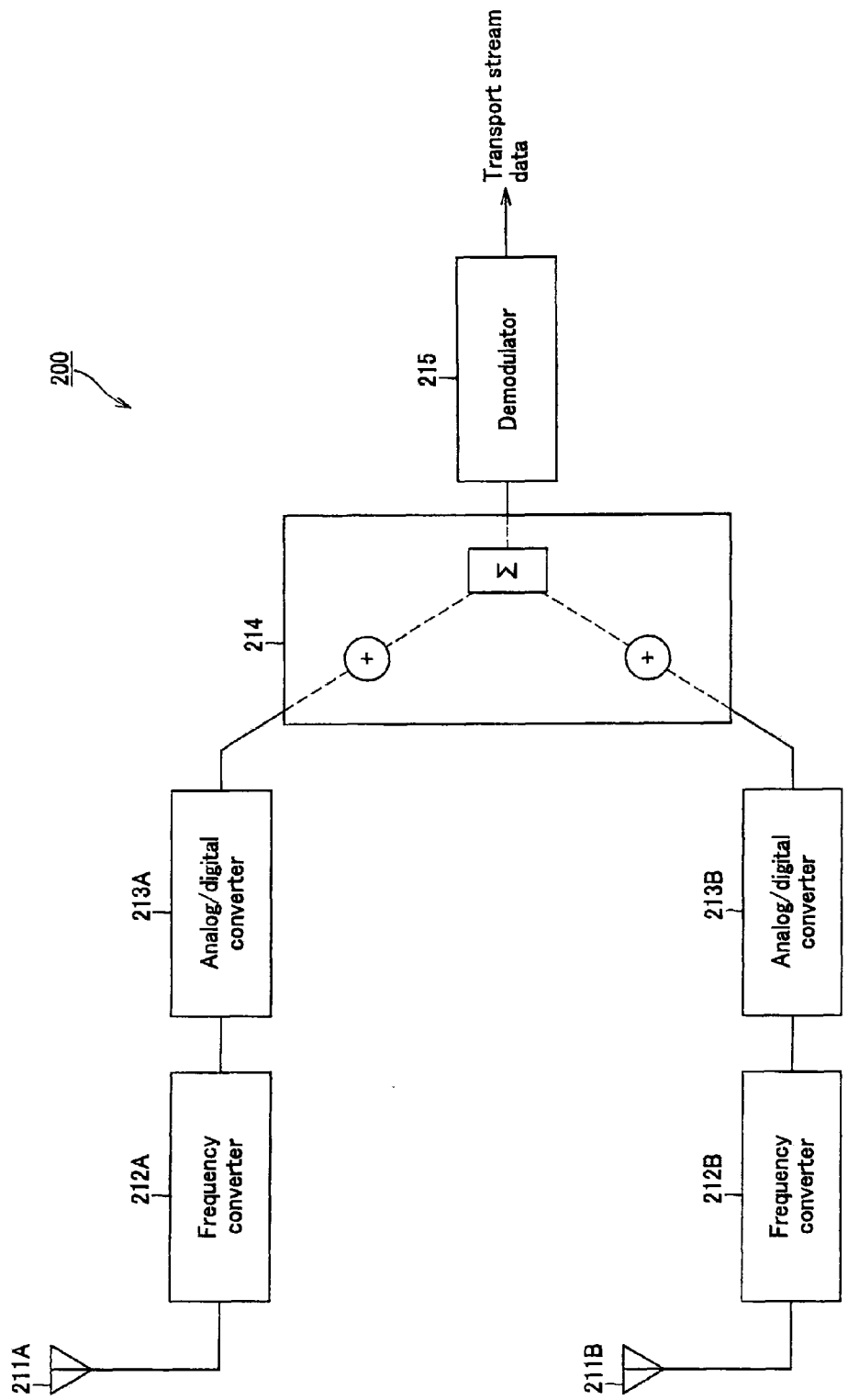
FIG. 2 is a schematic block diagram of a known reception apparatus adapted to prevent errors in diversity reception, illustrating the configuration thereof.
Figure 3:
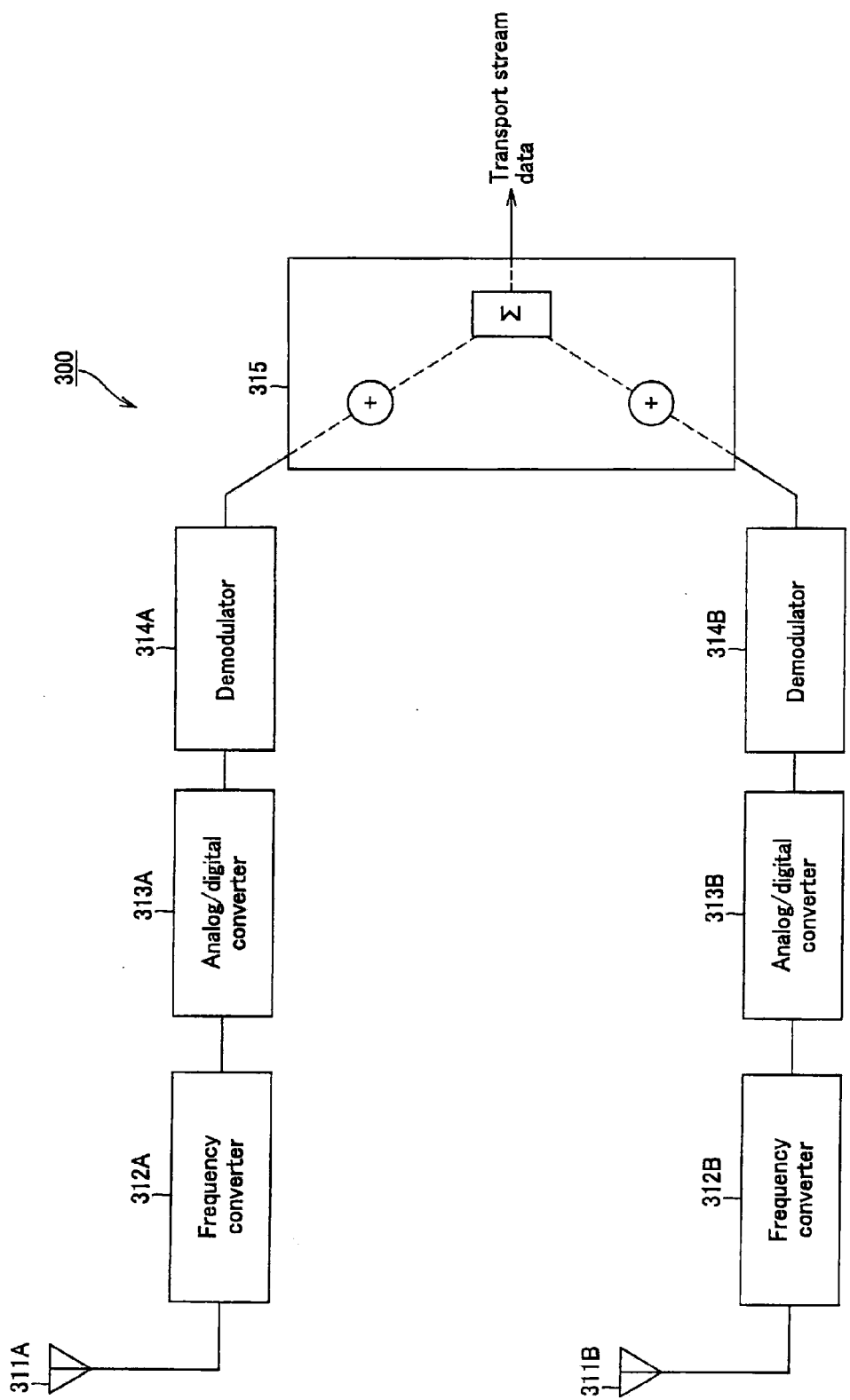
FIG. 3 is a schematic block diagram of another known reception apparatus adapted to prevent errors in diversity reception, illustrating the configuration thereof.
Figure 4:
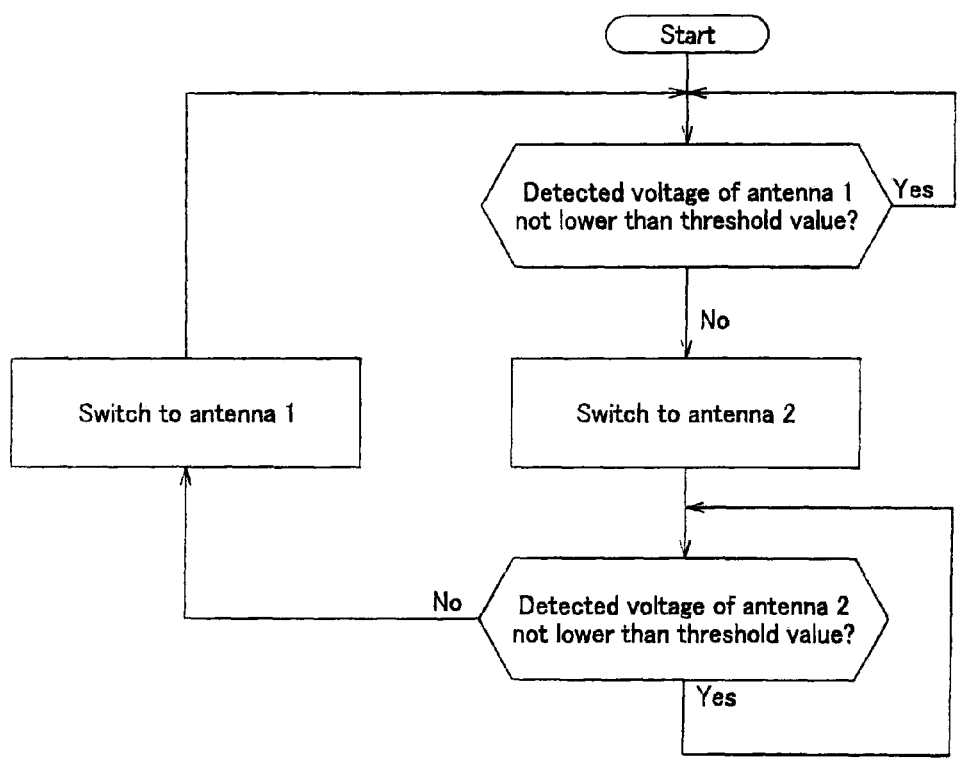
FIG. 4 is a flowchart of the operation of a known reception apparatus adapted to use a reception method of switching the antenna by defining a threshold value for the detected signal voltage in advance.
Figure 5:
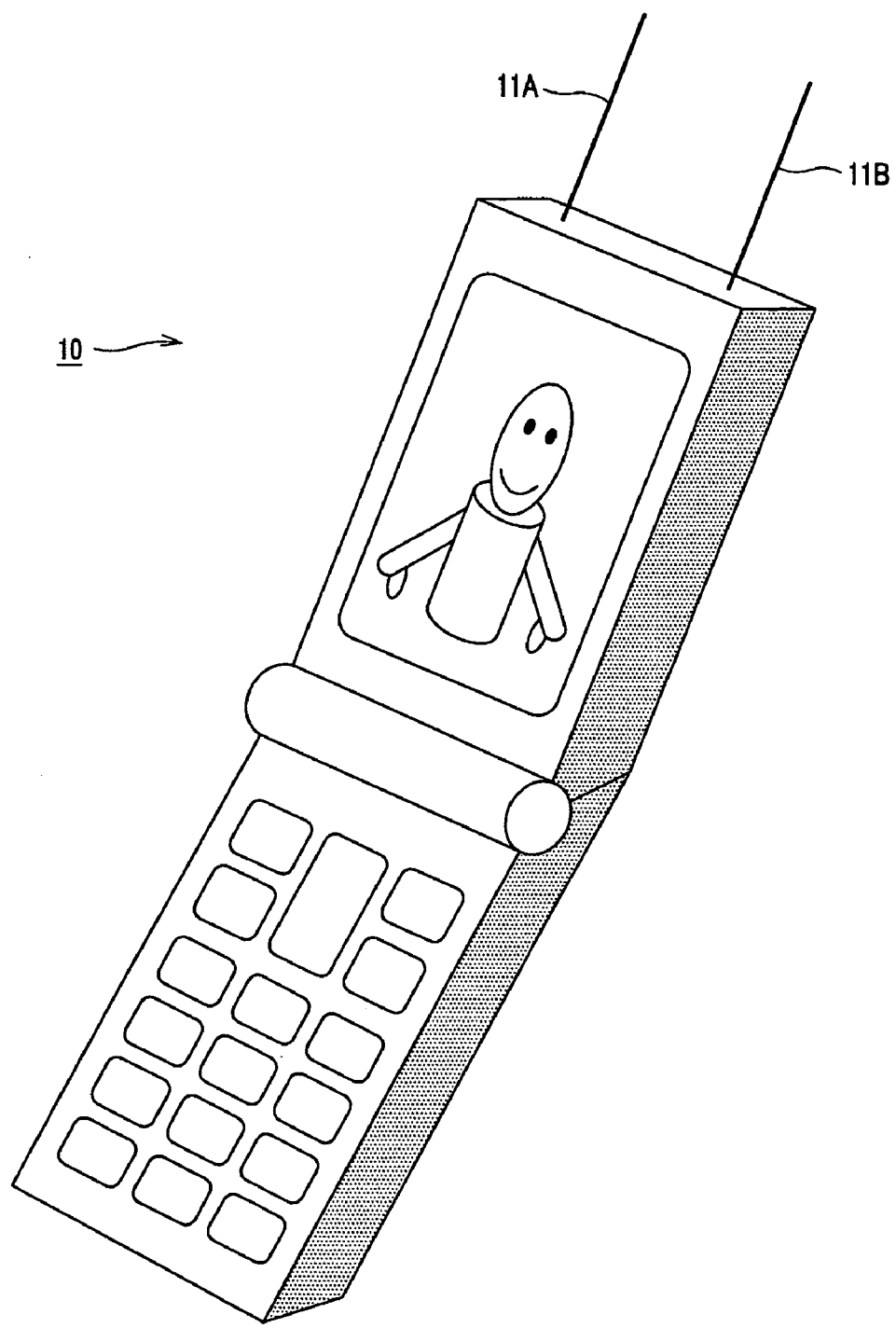
FIG. 5 is a schematic external perspective view of a portable terminal according to an embodiment of the present invention.

FIG. 5 illustrates an embodiment of the present invention, which is a portable terminal 10 equipped with two antennas 11A, 11B.

Figure 6:
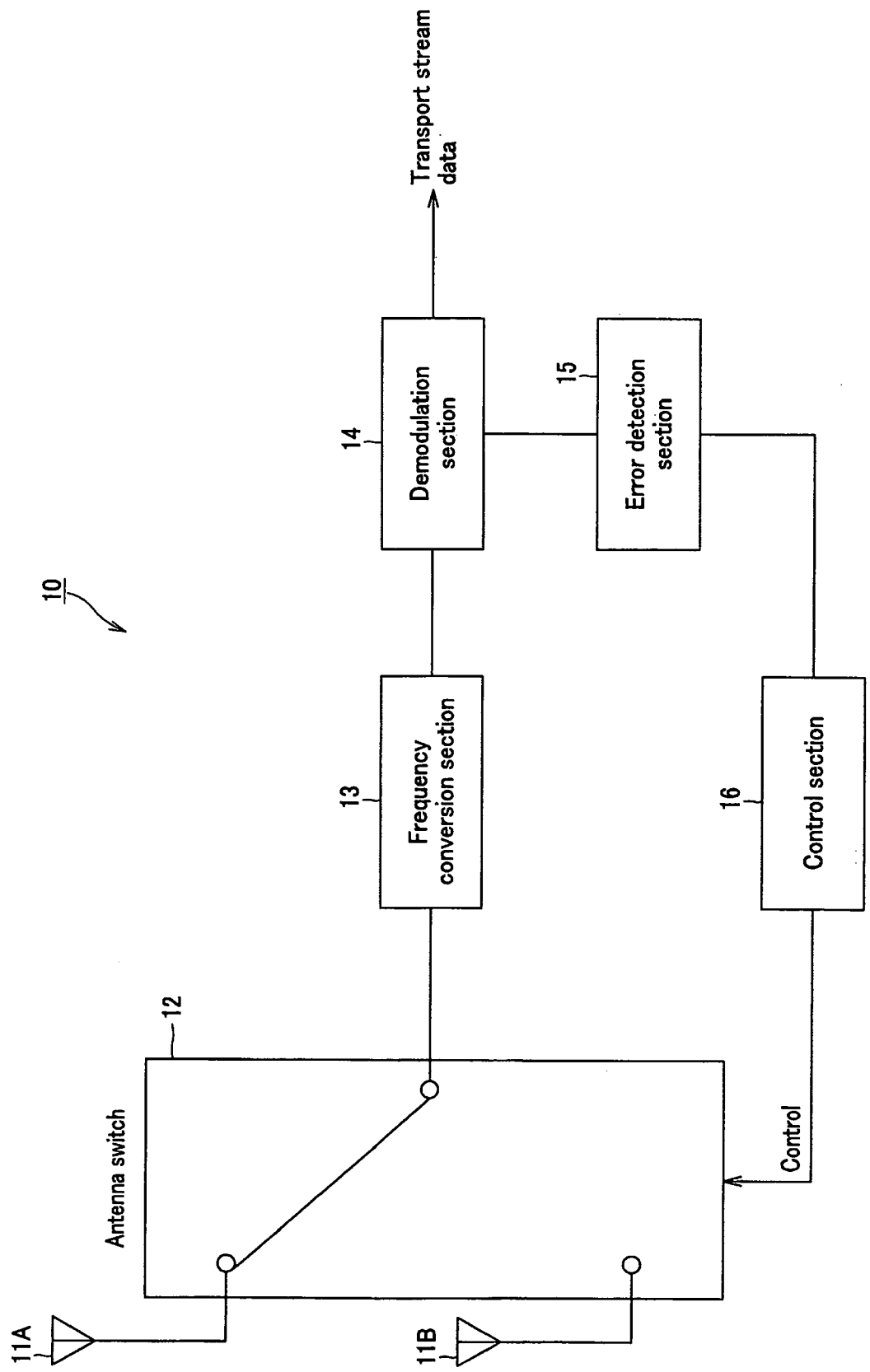
FIG. 6 is a schematic block diagram of the portable terminal of FIG. 1, illustrating the configuration of a principle part thereof.

Referring now to FIG. 6, the portable terminal 10 includes an antenna switch 12 connected to the two antennas 11A, 11B, a frequency converting section 13 connected to the antenna switch 12, a demodulation section 14 connected to the frequency converting section 13, an error detecting section 15 connected to the demodulation section 14 and a control section 16 connected to the error detecting section 15 and the control section 16 controls the switching operation of the antenna switch 12 according to the outcome of a comparison.

In the portable terminal 10, the frequency converting section 13 converts the frequency of the reception signal that is selectively supplied to it from the two antennas 11A, 11B by way of the antenna switch 12 and supplies the frequency-converted reception signal to the demodulation section 14.

The demodulation section 14 executes a demodulation process on the reception signal that is frequency-converted by the frequency converting section 13 and outputs the transport stream data obtained by demodulating the reception signal.

The error detecting section 15 detects errors in the stream data obtained by demodulating the reception signal by the demodulation section 14. The control section 16 determines if the number of errors detected by the error detecting section 15 exceeds a threshold value or not and, if the number of errors exceeds the threshold value, it switches the reception signal to be selected by the antenna switch 12.

In ordinary digital wireless communication systems, errors can be detected only by the reception side because signals are transmitted with error correction codes such as Reed-Solomon codes. Thus, the antennas 11A, 11B are switched according to the number of errors detected by such an arrangement.

Figure 7:
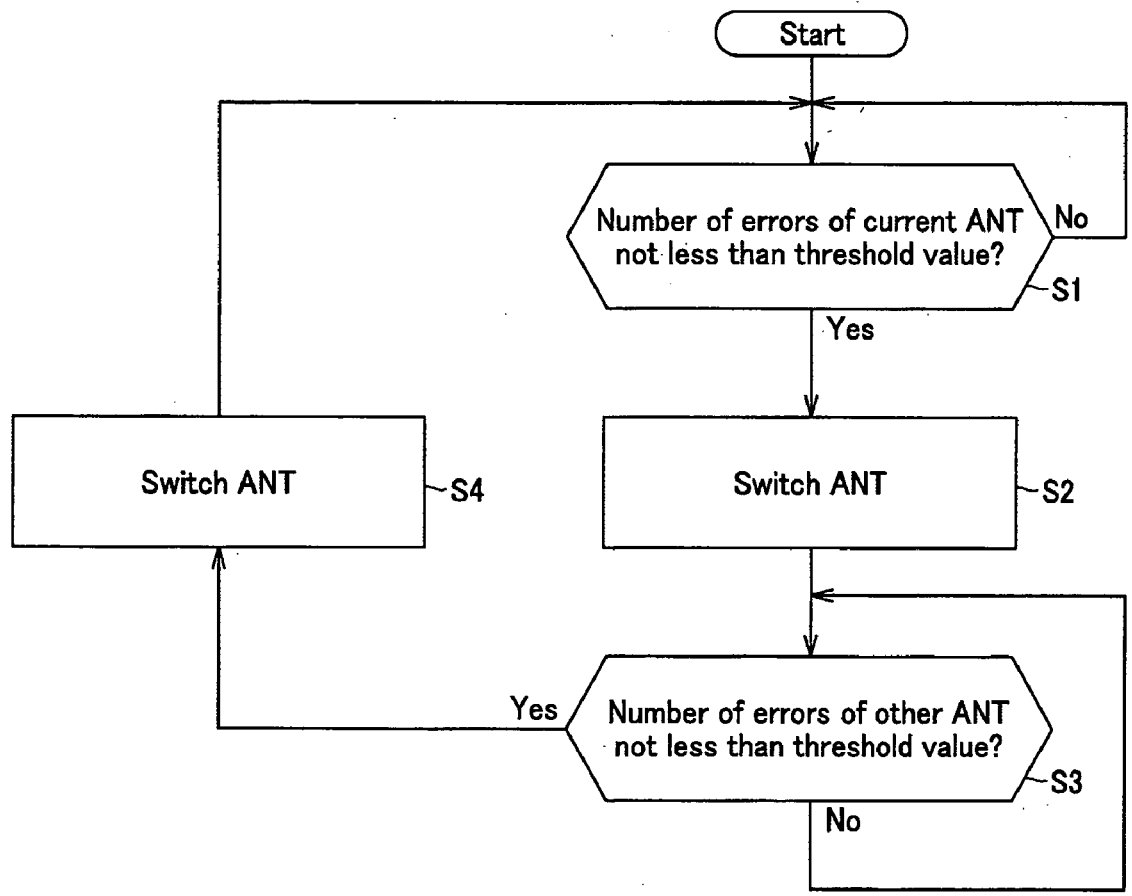
FIG. 7 is a flowchart of the operation of the portable terminal of FIG. 1.

Now, referring to the flowchart of FIG. 7, the portable terminal 10 starts an operation of signal reception, the control section 16 determines if the number of errors in the stream data obtained by demodulating the reception signal received by the antenna that is currently selected by the antenna switch 12, which is the antenna 11A for example, by means of the demodulation section 14 exceeds a threshold value or not (Step S1).

If the outcome of the determination in Step S1 is NO and hence the number of errors in the stream data is less than the threshold value, the control section 16 keeps on receiving the signal in the current state of signal reception and repeats the determining operation of Step S1.

If, on the other hand, the outcome of the determination in Step S1 is YES and hence the number of errors in the stream data is not less than the threshold value, the control section 16 switches the reception signal to be selectively received by means of the antenna switch 12 from that of the antenna 11A to that of the other antenna, or the antenna 11B (Step S2).

Then, the control section 16 determines if the number of errors in the stream data obtained by demodulating the reception signal received by the antenna 11B that is currently selected by the antenna switch 12 by means of the demodulation section 14 exceeds a threshold value or not (Step S3).

If the outcome of the determination in Step S3 is NO and hence the number of errors in the stream data is not more than the threshold value, the control section 16 keeps on receiving the signal in the current state of signal reception and repeats the determining operation of Step S3.

If, on the other hand, the outcome of the determination in Step S3 is YES and hence the number of errors in the stream data is not less than the threshold value, the control section 16 switches the reception signal to be selectively received by means of the antenna switch 12 from that of the antenna 11B to that of the original antenna, or the antenna 11A (Step S4) and returns to Step S1.

In this way, with this arrangement of switching the antennas 11A, 11B for receiving signals according to the selection of the antenna switch 12 that is made on the basis of number of errors and the threshold value, it is possible to select the antenna that is most adapted to the transmission environment.

In other words, if the number of errors in the stream data obtained by demodulating the reception signal received by one of the antennas, or the antenna 11A for instance, does not exceed the threshold value, the portable terminal 10 keeps on receiving the signal by way of the antenna 11A without switching it by means of the antenna switch 12. If, on the other hand, the number of errors exceeds the threshold value, the portable terminal 10 switches from the antenna 11A to the other antenna, or the antenna 11B, and demodulates the reception signal received by the antenna 11B to obtain the stream data. Then, the portable terminal 10 repeats the above switching process when the number of errors exceeds the threshold value.

Figure 8:
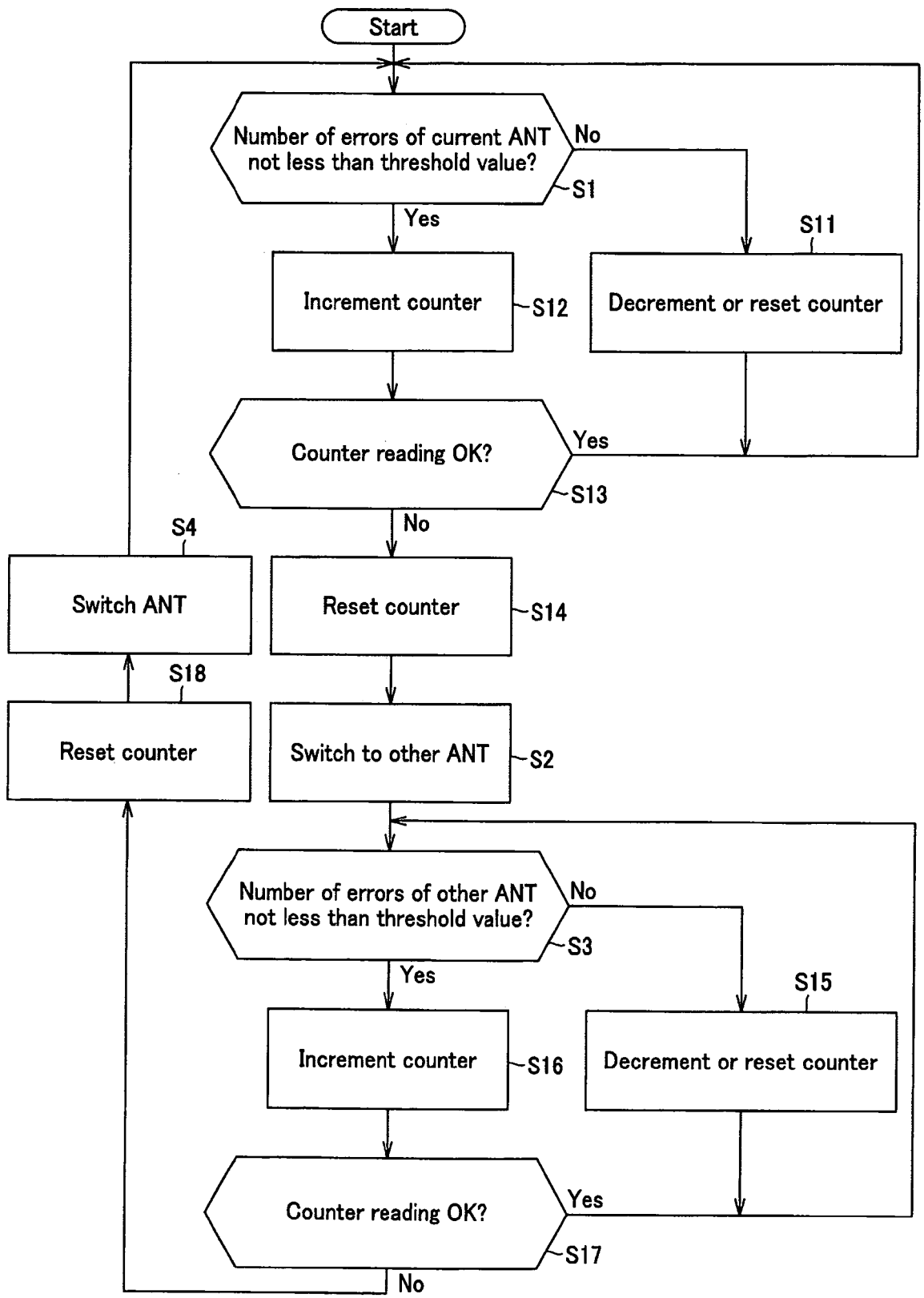
FIG. 8 is a flowchart of the operation of the portable terminal of FIG. 1 when the control section thereof is equipped with a competitive counter.

The control section 16 may be provided with a feature of competitive counter so as to be able to examine the error situation more minutely for the switch operation as illustrated in the flowchart of FIG. 8.

In this case, the control section 16 determines, after the start of reception, if the number of errors in the stream data obtained by demodulating the reception signal received by the antenna that is currently selected by the antenna switch 12, the antenna 11A for instance, by means of the demodulation section 14 is not less than the threshold value or not (Step S1).

If the outcome of the determination in Step S1 is NO and hence the number of errors in the stream data is not more than the threshold value, the control section 16 decrements or resets the competitive counter (Step S11) and returns to Step S1 to repeat the determination process so as to keep on receiving the signal in the current state of signal reception.

If, on the other hand, the outcome of the determination in Step S1 is YES and hence the number of errors in the stream data is not less than the threshold value, the control section 16 increments the competitive counter (Step S12) and determines if the reading of the competitive counter exceeds the threshold value or not (Step S13). If the outcome of the determination in Step S13 is YES and hence the reading of the competitive counter does not exceed the threshold value, the control section 16 returns to Step S1 to repeat the determination operation there and keeps on receiving the signal in the current state of signal reception. If, on the other hand, the outcome of the determination in Step S13 is NO and hence the reading of the competitive counter exceeds the threshold value, the control section 16 resets the competitive counter (Step S14) and switches the reception signal selected by the antenna switch 12 from the one received by the antenna 11A to the one received by the antenna 11B (Step S2).

Then, the control section 16 determines if the number of errors in the stream data obtained by demodulating the reception signal received by the antenna 11B that is currently selected by the antenna switch 12 by means of the demodulation section 14 is not less than the threshold value or not (Step S3).

If the outcome of the determination in Step S3 is NO and hence the number of errors in the stream data is not more than the threshold value, the control section 16 decrements or resets the competitive counter (Step S15) and returns to Step S3 to repeat the determination process and keep on receiving the signal in the current state of signal reception.

If, on the other hand, the outcome of the determination in Step S3 is YES and hence the number of errors in the stream data is not less than the threshold value, the control section 16 increments the competitive counter (Step S16) and determines if the reading of the competitive counter exceeds the threshold value or not (Step S17). If the outcome of the determination is YES and hence the reading of the competitive counter does not exceed the threshold value, the control section 16 returns to Step S3 to repeat the determination process there and keeps on receiving the signal in the current state of signal reception. If, on the other hand, the outcome of the determination in Step S17 is NO and hence the reading of the competitive counter exceeds the threshold value, the control section 16 resets the competitive counter (Step S18) and then switches the antenna 11B selected by the antenna switch 12 for receiving the reception signal to the original antenna, or antenna 11A (Step S4), before it returns to Step S1.

In this way, with this arrangement of switching the antennas 11A, 11B for receiving signals according to the selection of the antenna switch 12 that is made on the basis of number of errors and the threshold value, it is possible to select the antenna that is most adapted to the transmission environment.

When the numbers of errors in the stream data obtained by demodulating the reception signals received by the two antennas 11A, 11B exceed the threshold value, it is not possible to receive the signals if the diversity reception mode is not selected. In other words, when the numbers of errors in the stream data obtained by demodulating the reception signals received by the two antennas 11A, 11B exceed the threshold value, it is not possible to receive either of the signals by means of a single antenna without selectively using the two antennas because the errors attributable to the electric field level lowered by shadowing and/or a long traveling distance of the signal are dominant relative to the errors attributable to the interference waves that can be eliminated by switching the antennas, the directivity of the antennas and the influence of noises. If the signal level is high but errors occur due to noises and distortions, errors can be detected by means of an error detection circuit so that it is possible to appropriately switch the antennas. Therefore, with the above-described arrangement, it is possible to suppress interference waves and noises, reduce the period where errors arise if compared with the use of a single antenna and improve the signal reception ratio by switching the antennas. Additionally, since a single reception system is used and, in other words, a plurality of receivers and a plurality of signal reception systems are not used, it is possible to downsize the portable terminal and reduce the power consumption rate of the terminal. In the case of digital transmission such as digital broadcasting, this embodiment is highly effective because it is possible to reduce the unnecessary number of times of antenna switching and hence the number of discontinuity factors that give rise to problems in digital transmission if compared with antenna switching that relies on the detected voltage. Particularly, in the case of receiving digital television signals by means of a notebook type personal computer or a portable terminal that is normally held in a stationary state, this embodiment is highly effective because undulations in the signal level that occur instantaneously are relatively small. While the threshold value that has to be appropriately defined may vary depending on the transmission profile, the equipment mounted in the apparatus and the antennas to be used with the apparatus, it is possible to improve the signal reception ratio when a threshold value is unequivocally defined for the transmission method that is being used for signal reception if compared with the use of a single antenna.

The portable terminal 10 of the above-described embodiment of the present invention is provided with two antennas 11A, 11B as plurality of input means for inputting reception signals of a plurality of different types showing different signal receiving conditions so as to realize a diversity reception mechanism. However, the present invention is also applicable to a portable terminal 20 including a plurality of circuit elements as so many input means for selecting the input characteristics of reception signals as shown in FIG. 9.

In any ordinary wireless circuit, it is difficult to correctly presume the circuit that is connected to the signal input section of the circuit. Therefore, this portable terminal 20 of this embodiment is adapted to selectively use different states for signal transmission and reception depending on the circuit connected to the signal input section of the terminal.

Assume here a case of receiving digital television broadcast signals. The frequency band to be used for digital television broadcasting is very wide and antennas of various different types may be used to accommodate the various modes of signal reception. For example, the impedance is low when the size of antenna is large relative to the wavelength as in the instance of a headphone antenna, whereas the impedance is high when the size of antenna is small relative to the wavelength as in the instance of an antenna contained in a portable appliance. Then, the behavior of the input signal may vary depending on the antenna by way of which it is input. Thus, it is difficult to obtain a signal with excellent input characteristics over a wide frequency band, covering a plurality of states of circuits.

Figure 9:
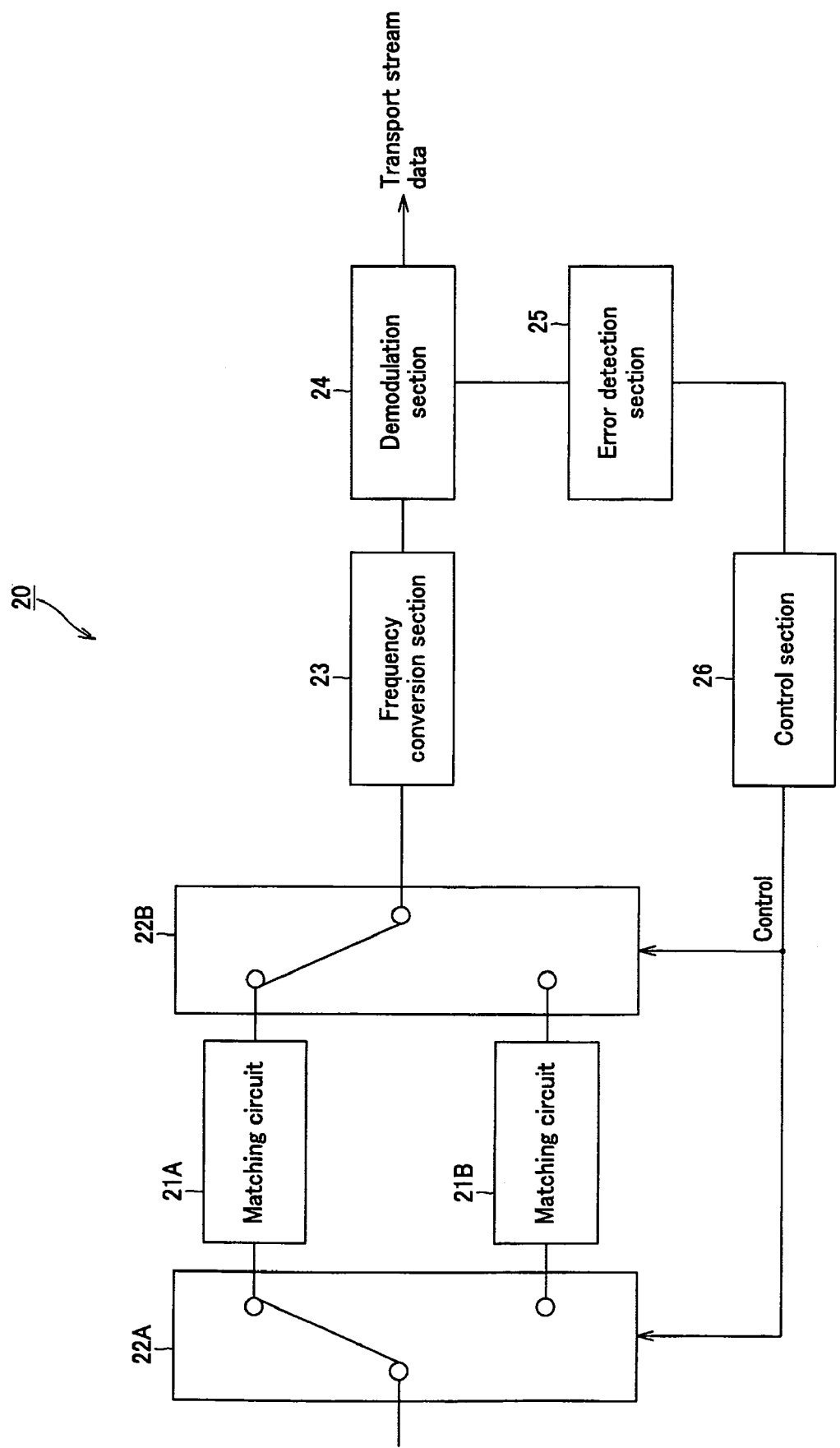
FIG. 9 is a schematic block diagram of another portable terminal according to an embodiment of the present invention, illustrating the configuration of a principle part thereof.

Referring to FIG. 9, the portable terminal 20 of this embodiment includes a plurality of matching circuits 21A, 21B that correspond to a plurality of assumed antennas as a plurality of circuit elements for selecting input characteristics for the reception signal and the matching circuits 21A, 21B are selectively connected to the frequency converting section 23 by way of input selection switches 22A, 22B that are controlled by the control section 26 for switching operations so that the reception signal from the selected antenna or the selected feeder line is supplied to the frequency converting section 23 by way of the selected one of the matching circuits 21A, 21B.

The frequency converting section 23 converts the frequency of the reception signal supplied by way of the selected one of the matching circuits 21A, 21B and supplies the signal to the demodulation section 24.

The demodulation section 24 carries out a demodulation process on the reception signal that is subjected to frequency conversion by the frequency converting section 23 and outputs the transport stream data obtained by demodulating the reception signal.

Then, the error detecting section 25 detects errors in the stream data obtained by demodulating the reception signal by the demodulation section 24. The control section 26 determines if the number of errors detected by the error detecting section 25 exceeds a threshold value or not and, if it is determined that the number of errors exceeds the threshold value, it switches the matching circuits 21A, 21B by means of the input selection switches 22A, 22B.

With the above-described arrangement, the portable terminal 20 can suppress the degradation of the reception signal to a minimum level when the antenna that is being used is switched.

Figure 10:
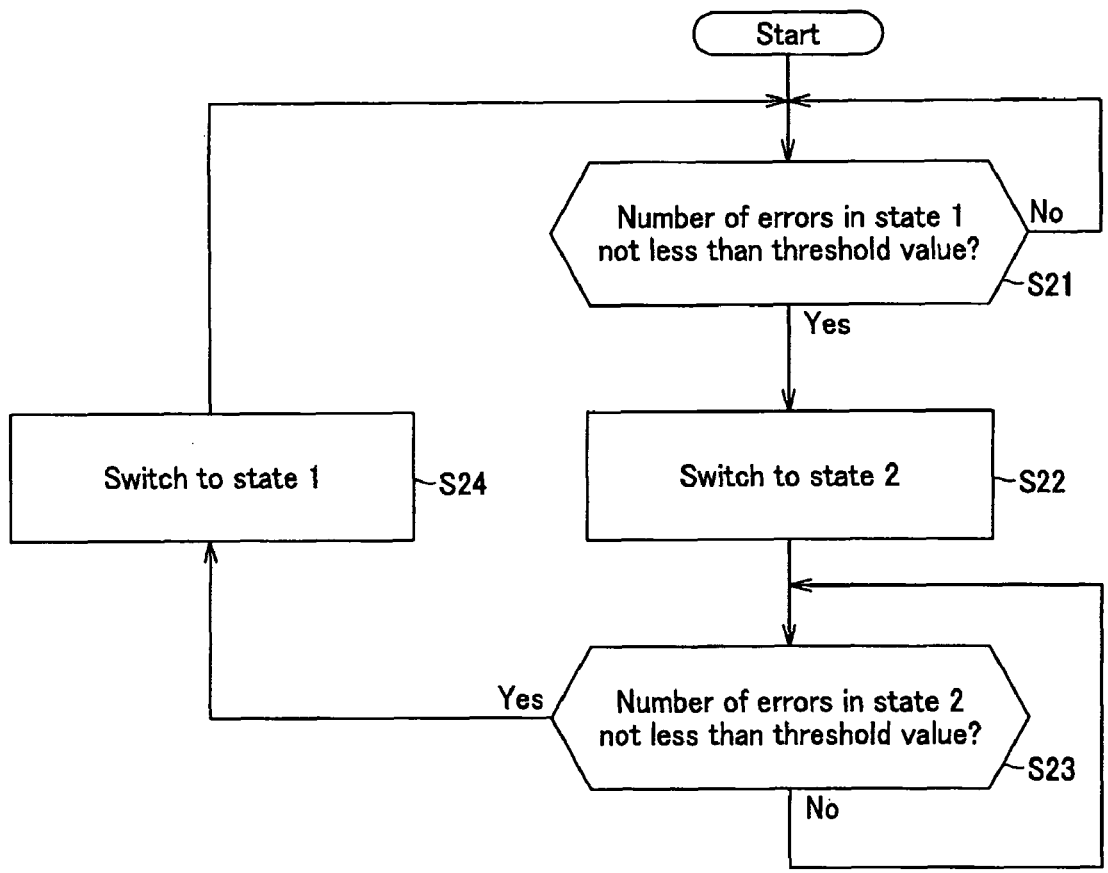
FIG. 10 is a flowchart of the operation of the portable terminal of FIG. 9.

The matching circuit 21A, 21B are selectively used according to the number of the detected errors or the ratio of the detected errors in the signal as in the case of the selective use of antennas according to the flowchart of FIG. 10.

Referring to FIG. 10, the control section 26 starts a signal receiving operation, it determines if the number of errors in the stream data obtained by demodulating the reception signal that is obtained by the currently selected matching circuit, the matching circuit 21A for instance, by means of the demodulation section 14 is not less than a threshold value of not (Step S21).

Then, if the outcome of the determination in Step S21 is NO and hence the number of errors in the stream data is not more than the threshold value, the control section 26 repeats the above determination process of Step S21 and keeps on receiving the signal in the current signal receiving condition.

If, on the other hand, the outcome of the determination in Step S21 is YES and hence the number of errors in the stream data is not less than the threshold value, the control section 26 switches the matching circuit selected by means of the input selection switches 22A, 22B from the matching circuit 21A to the other matching circuit 21B (Step S22).

Then, the control section 26 determines if the number of errors in the stream data obtained by demodulating the reception signal by means of the demodulation section 14, the reception signal being obtained by the currently selected matching circuit 21B that is selected by means of the input selection switches 22A, 22B, exceeds the threshold value or not (Step S23).

If the outcome of the determination in Step S23 is NO and hence the number of errors in the stream data is not more than the threshold value, the control section 26 repeats the above determination process of Step S23 and keeps on receiving signal in the current signal receiving condition.

If, on the other hand, the outcome of the determination in Step S23 is YES and hence the number of errors in the stream data is not less than the threshold value, the control section 26 switches the matching circuit selected by means of the input selection switches 22A, 22B from the matching circuit 21B to the other matching circuit 21A (Step S24) and returns to Step S21.

In this way, it is possible to suppress the degradation of the reception signal to a minimum level when the antenna that is being used is switched by switching the matching circuit from the matching circuit 21A to the matching circuit 21B or vice versa that is selected by means of the input selection switches 22A, 22B on the basis of the number or errors and the threshold value.

A threshold value may be defined for each switching condition. More specifically, when the probability of selecting the matching circuit 21A is higher than the probability of selecting the matching circuit 21B, the threshold value for selecting the matching circuit 21A may be defined to a value higher than the threshold value for selecting the matching circuit 21B so that the matching circuit 21B may be rarely selected.

While the matching circuits 21A, 21B that correspond to the plurality of antennas connected to them are provided as the plurality of circuit elements for selecting input characteristics for the reception signal in the portable terminal 20, the matching circuits 21A, 21B may be replaced by some other devices such as one or more than one amplifiers, attenuators and/or filters. The power source for supplying power to such circuits may be controlled to switch their operations.

For example, by paying attention to the reception area, it will be appreciated that the level of the reception signal clearly differs between a place located close to the broadcasting station and a place remote from the broadcasting station and found normally in a rural area. Since the level of the reception signal is low in an area remote from the broadcasting station, it may be necessary to use an amplifier. If an amplifier is used in an area located close to the broadcasting station, on the other hand, signal distortions may arise due to nonlinearity and then errors can occur. The use of an attenuator may be necessary depending on the situation. The signal level will also be considerably high when the antenna is taken off and a feeder line is directly connected to the signal input terminal.

Thus, when the matching circuit 21A, 21B are replaced by an amplifier and an attenuator so as to be switched by the input selection switches 22A, 22B, the amplifier will be highly probably selected in an area where the signal level is low, whereas the attenuator will be highly probably selected in an area where the signal level is high and the signal can be distorted. The net result will be an improved reception ratio. If the difference is remarkable between the situation where the amplifier is used and the situation where the attenuator is used, threshold values may be defined for them independently according to the respective situations.

Figure 11:
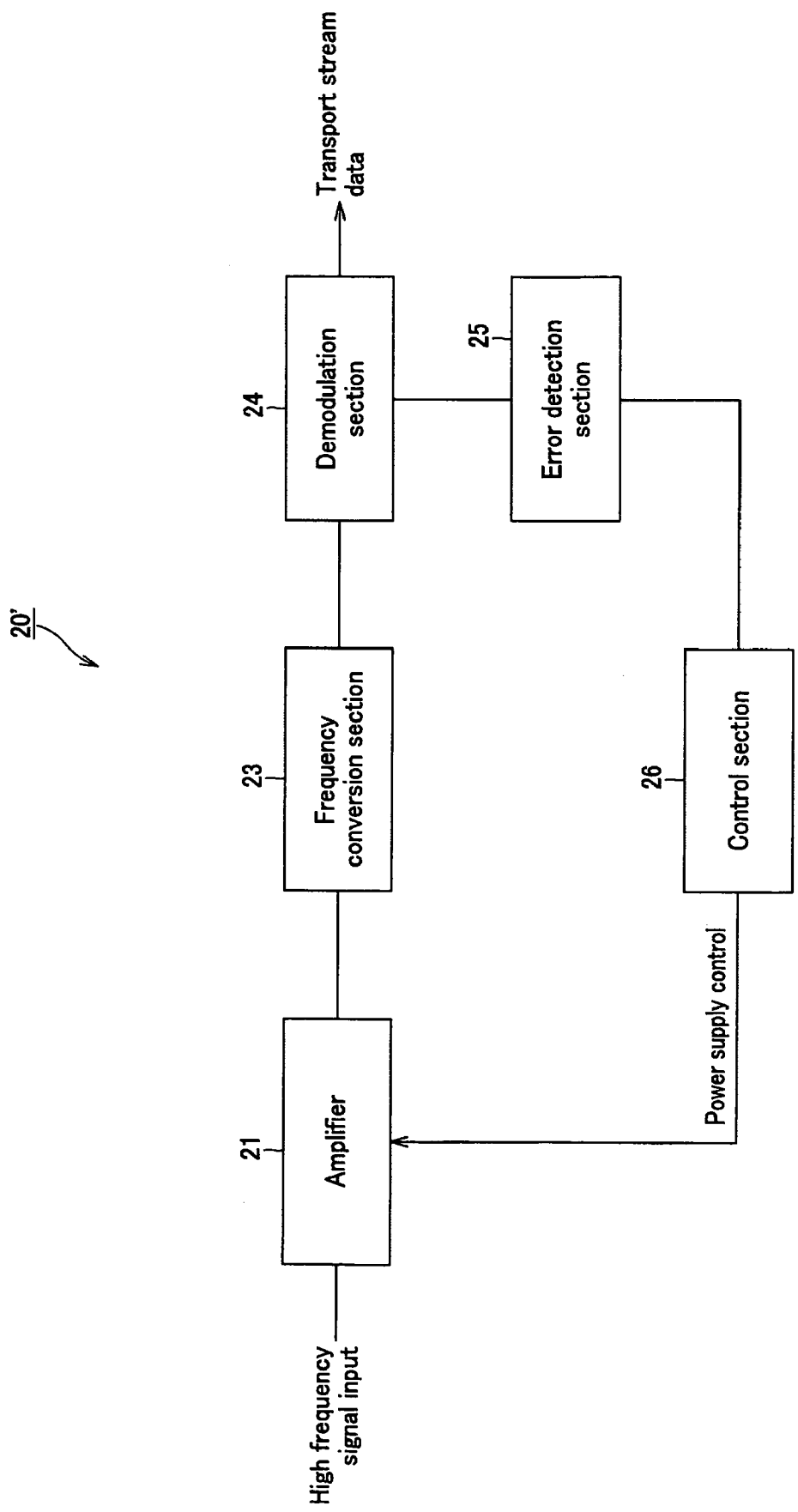
FIG. 11 is a schematic block diagram of still another portable terminal according to an embodiment of the present invention, illustrating the configuration of a principle part thereof.

It is also possible to select the signal receiving condition by turning ON/OFF the power supply to the amplifier 21 to change the operating circuit (amplification/attenuation or amplification/through) as shown in FIG. 11. The signal level will be considerably high when the antenna is taken off and a feeder line is directly connected to the signal input terminal. However, it is possible to accommodate a plurality of different situations by selecting the signal receiving condition by means of a similar arrangement.

Additionally, by paying attention to the environment of signal transmission, it will be appreciated that, when some other user is tuning in a different frequency, the radio wave can influence the system of the user.

In such a case, it is possible to reduce the influence of some other frequency by providing a low-pass check filter and a high-pass check filter or band pass filters in place of the matching circuits 21A, 21B and selectively using them by means of the input selection switches 22A, 22B. The selection of a signal receiving condition is effective because it may not be necessary to use a filter depending on the situation and, when the use of a filter is not necessary, an amplifier has to be used in the worst case to consequently raise the power consumption rate. An active filter that is adapted to select a frequency band by controlling the power supply may also be used in this embodiment.

Figure 12:
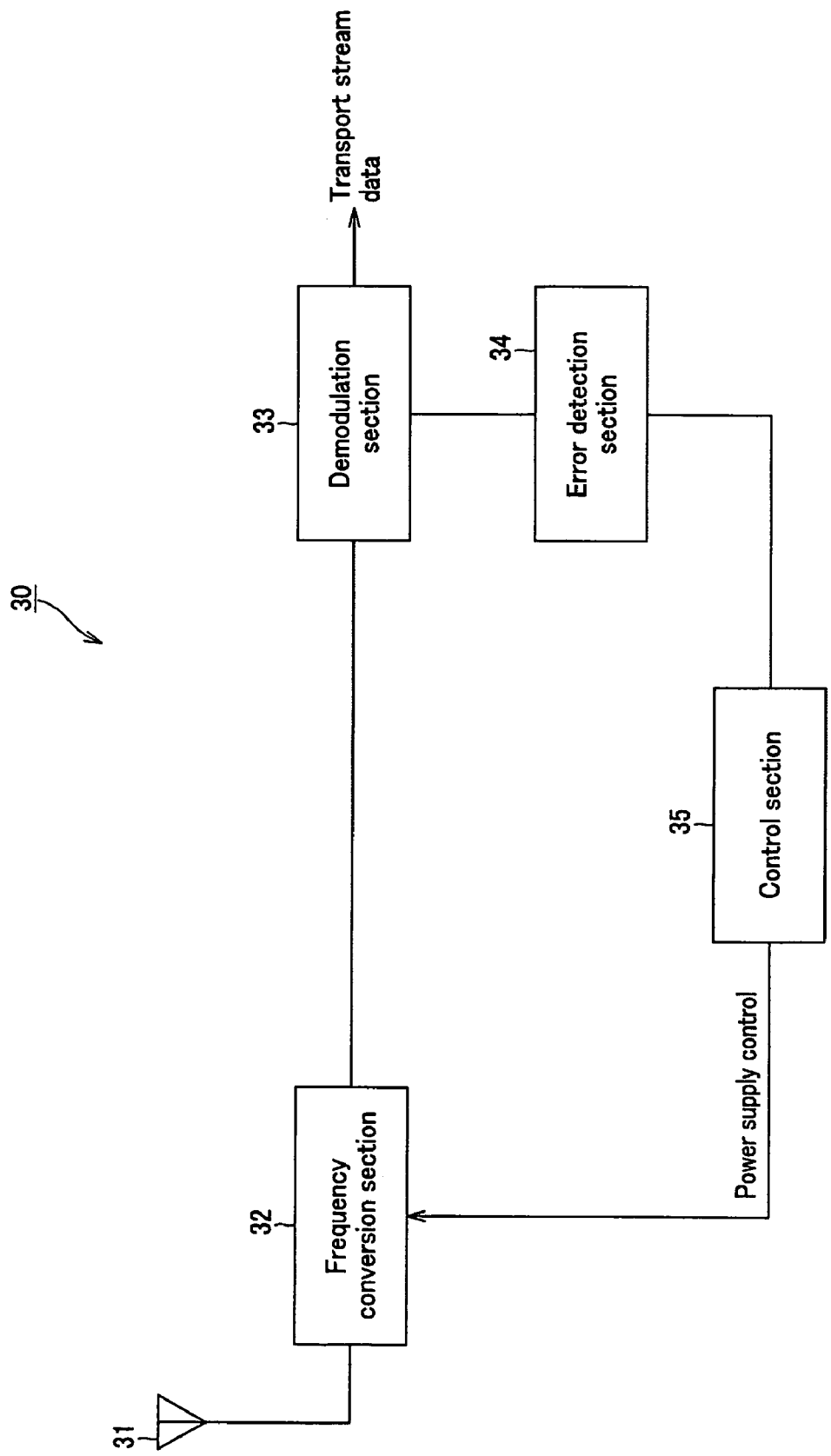
FIG. 12 is a schematic block diagram of still another portable terminal according to an embodiment of the present invention, illustrating the configuration of a principle part thereof.
Figure 13:
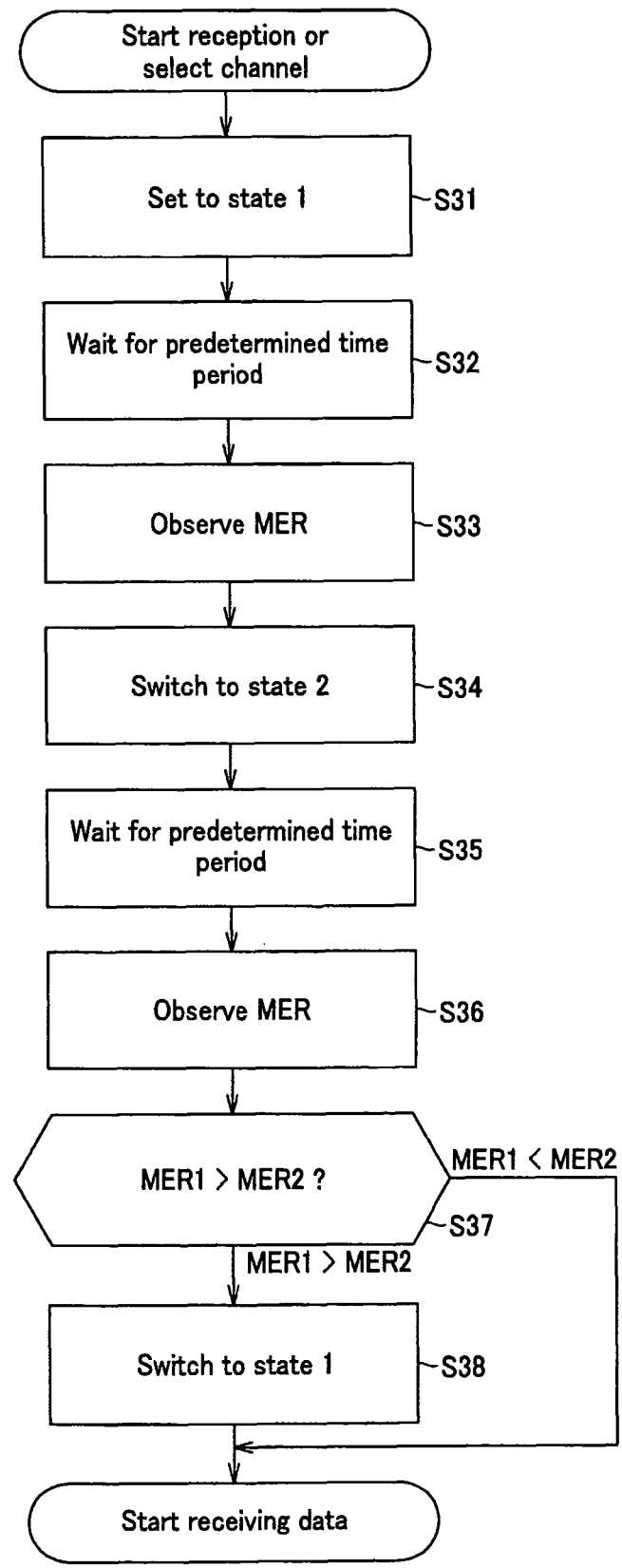
FIG. 13 is a flowchart for controlling the operation of switching the state of reception in response to error detection as an example of inputting a signal, which is a digital broadcast signal where pilot signals are inserted in predetermined positions, received by a portable terminal according to an embodiment of the present invention.

In the case of a broadcasting system that utilizes a multi-frequency network (MFN), a same television program may be broadcast in different areas with different frequencies. Then, the present invention may be applied to a portable terminal 30 including a frequency converting section 32 that is adapted to a multi-frequency network as input means for inputting a reception signal as shown in FIG. 12. With such a portable terminal 30, it is possible to select a frequency (channel) by which the program is being broadcast and which provides a better signal receiving condition so long as a channel plan is effectively observed.

In other words, this portable terminal 30 includes a frequency converting section 32 that is adapted to a multi-frequency network and converts the frequency of the reception signal supplied by way of the antenna 31 by means of the frequency converting section 32 before supplying the reception signal to the demodulation section 33.

The demodulation section 33 carries out a demodulation process on the reception signal that is subjected to the frequency conversion process by the frequency converting section 23 and outputs the transport stream data obtained by demodulating the reception signal.

Then, the error detecting section 34 detects errors in the stream data obtained by demodulating the reception signal by means of the demodulation section 33. The control section 35 determines if the number of errors detected by the error detecting section 34 exceeds the threshold value or not and, if the number of errors exceeds the threshold value, it switches the operation of the frequency converting section 32.

Now, a specific example of controlling the operation of switching the signal receiving condition according to the outcome of error detection in a reception signal that is a digital broadcast signal where pilot signals are inserted at predetermined positions will be described below by referring to the flowchart of FIG. 9.

As the portable terminal starts receiving the digital broadcast signal or tunes in the channel transmitting the signal, the control section sets the antenna or the state circuit to state 1 (Step S31) and waits until a predetermined period of time elapses (Step S32). Then, the control section observes the modulation error ratio (MER) after the elapse of the predetermined period of time (Step S33).

Thereafter, the control section sets the antenna or the state circuit to state 2 (Step S34) and waits until a predetermined period of time elapses (Step S35). Then, the control section observes the modulation error ratio (MER) after the elapse of the predetermined period of time (Step S36).

The modulation error ratio (MER) is computed on the basis of the carrier wave of the scattered pilot signals (SP) that are inserted in the input digital broadcast signal input as reception signal. It is possible to reliably observe the modulation error ratio and avoid the influence of switching the state by providing a predetermined period of waiting time after switching the state.

The modulation error ratio (MER) is an evaluation measure defined in ETR290: Measurement guidelines for DVB system by ETSI (European Telecommunications Standards Institute) that is a standard institute of Europe, and is computed using the amplitude S(i) at the i-th ideal signal point and the error amplitude n(i) at the i-th reception signal point in a digital broadcast signal of the OFDM system by means of the formula (1) shown below.

[formula (1)]

$$MER[dB] = 10 \log_{10}\left(\sum_{i=0}^{N} s(i)^2 \bigg/ \sum_{i=0}^{N} n(i)^2\right) \quad (1)$$

Then, the modulation error ratio MER1 observed when the antenna or the state circuit is set to state 1 and the modulation error ratio MER2 observed when the antenna or the state circuit is set to state 2 are compared (Step S37) and, state 1 is selected when MER1>MER2 to start receiving data, whereas state 2 is selected when MER1<MER2 to start receiving data.

In this way, it is possible to recognize the situation of the state instantaneously at the time of error detection by using modulation error ratios.

As for the order according to which states are sequentially selected, the number of switching operations can be reduced by searching for the state that shows the highest probability for being selected (the highest MER value) last.

Figure 14:
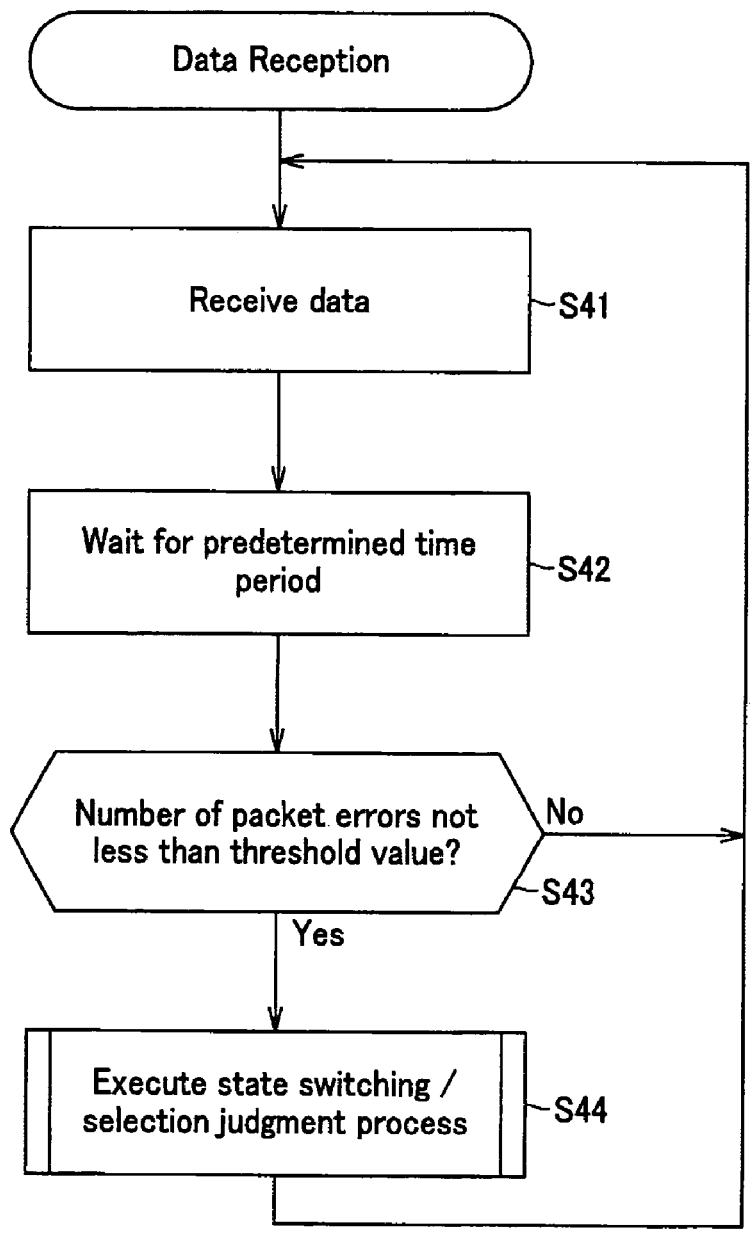
FIG. 14 is a flowchart of the control operation in a steadily operating time after the start of data reception by a portable terminal according to an embodiment of the present invention, the control operation being illustrated as a specific example.
Figure 15:
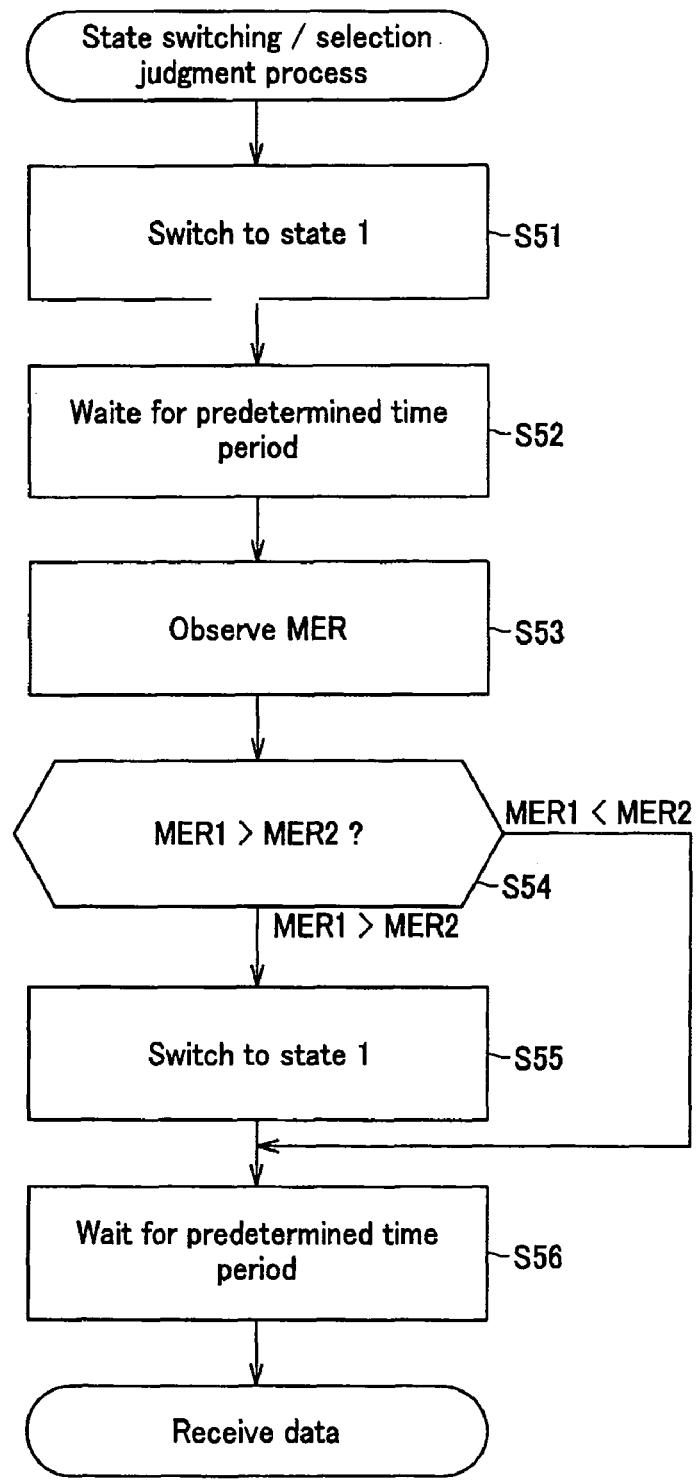
FIG. 15 is a detailed flowchart of the judgment/selection process for switching the state in the control operation in a steadily operating time after the start of data reception by the portable terminal of FIG. 14.

Now, a specific example of control operation after the start of data reception will be described by referring to the flowchart of FIG. 14.

When the portable terminal starts receiving data (Step S41), the control section waits until a predetermined period of time elapses (Step S42). Then, after the elapse of the predetermined period of time, during which a predetermined number of packets are received, the control section determines if the outcome of the error detection obtained by counting the number of packet errors (the number of packet errors or the ratio thereof) due to the transmission of packets that contains error correction codes such as Reed-Solomon codes exceeds an error threshold value or not (Step S43). If the number of packet errors is not more than the threshold value, the current state is maintained and the data reception is continued. If, on the other hand, the number of errors or the ratio thereof is not less than the threshold value, the control section switches the state and moves to a state switching/selection judgment process (Step S44).

In Step S43, the control section observes the modulation error ratio (MER) in state 1 simultaneously with the packet error. With this arrangement, it is possible to carry out the state switching/selection judgment process quickly in Step S44.

In the state switching/selection judgment process, the control section moves the state circuit from the current state, state 1 for instance, into another state, or state 2, (Step S51) and waists until the predetermined period of time elapses (Step S52). When the predetermined period of time elapses, the control section observes the modulation error ratio (MER) in that state (Step S53).

Then, the control section compares the modulation error ratio MER1 observed in state 1 and the modulation error ratio MER2 observed after the move into state 2 (Step S54). It switches to state 1 (Step S55) and waits until a predetermined period of time elapses (Step S56) before it returns to Step S41 and starts receiving data in state 1 when MER1>MER2, whereas it waits until the predetermined period of time elapses (Step S56) before it returns to Step S41 and starts receiving data in state 2 when MER1<MER2.

After carrying out the state switching/selection judgment process, the control section does not immediately start detecting packet errors but waits until a predetermined period of time elapses to reduce the number of unnecessary state switching operations.

While a single function is switched in the above-described embodiment, two or more than two functions may be switched. For example, a state machine may be designed in the following manner. The operation of switching antennas and that of switching amplification/through of amplifier may be controlled in a combined manner. When controlling the switching operations, priority may be given to the operation of switching antennas relative to that of switching the operation of amplifier. In other words, antennas are switched first when errors are detected. When both antennas produce errors, the operation of the amplifier may be switched.

It should be understood by those skilled in the art that various modifications, combinations, sub-combinations and alterations may occur depending on design requirements and other factors insofar as they are within the scope of the appended claims or the equivalents thereof.

What is claimed is:

1. A reception terminal apparatus comprising:
   input means for selectively inputting a reception signal from reception signals of a plurality of types in different states of reception;
   defining means for defining a separate threshold value for each of a plurality of matching circuits corresponding to antennas, the plurality of matching circuits being used to match impedances of the antennas;
   selection means for selecting a first matching circuit out of the plurality of matching circuits corresponding to a particular antenna according to input characteristics of the reception signal, and an impedance of the particular antenna;
   demodulation means for demodulating the reception signal input by the input means;
   error detection means for detecting errors in the stream data obtained by the demodulation means;
   control means for determining if the number of errors as detected by the error detection means exceeds a threshold value corresponding to the first matching circuit; and
   switching means for switching from the first matching circuit to a second matching circuit having a higher threshold value when the number of errors exceeds the threshold value defined for the first matching circuit.

2. The apparatus according to claim 1, wherein
   the input means includes a plurality of antenna elements, a changeover switch for switching the plurality of antenna elements, frequency conversion means for executing a frequency conversion process on the reception signal received by way of the antenna element selected by the changeover switch and demodulation means for executing a demodulation process on the reception signal subjected to the frequency conversion process by the frequency conversion means, and the changeover switch is adapted to switch the antenna element it selects when the number of errors as counted by the control means exceeds the threshold value.

3. The apparatus according to claim 1, wherein the input means includes a plurality of circuit elements to be used for switching the input characteristics of the reception signal, a selection switch for selecting one of the plurality of circuit elements, frequency conversion means for executing a frequency conversion process on the reception signal obtained by way of the circuit element selected by the selection switch and demodulation means for executing a demodulation process on the reception signal subjected to the frequency conversion process by the frequency conversion means, and the selection switch is adapted to switch the circuit element it selects when the number of errors as counted by the control means exceeds the threshold value.

4. The apparatus according to claim 1, wherein the input means includes a circuit element that can freely change the input characteristics of the reception signal by controlling the power supply, frequency conversion means for executing a frequency conversion process on the reception signal obtained by way of the circuit element and demodulation means for executing a demodulation process on the reception signal subjected to the frequency conversion process by the frequency conversion means, and the circuit element is adapted to switch the input characteristics of the reception signal by controlling the power supply when the number of errors as counted by the control means exceeds the threshold value.

5. The apparatus according to claim 1, wherein the input means includes:

frequency conversion means adapted to a multi-frequency network; and demodulation means for executing a demodulation process on the reception signal subjected to the frequency conversion process by the frequency conversion means, and the frequency conversion means is adapted to switch its operation when the number of errors as counted by the control means exceeds the threshold value.

6. The apparatus according to claim 1, wherein the error detection means detects packet errors of error correction codes, and the control means observes the packet error ratio in a predetermined span as detected by the error detection means and performs a switching control operation of changing the reception signal input to the demodulation means by the input means when the value of the packet error ratio exceeds a threshold value.

7. The apparatus according to claim 6, wherein the control means observes the packet error ratio in a predetermined span as detected by the error detection means and includes a competitive counter for performing a counting operation on the condition that the value of the packet error ratio exceeds the threshold value so as to start the switching control operation according to the reading of the competitive counter.

8. The apparatus according to claim 6, wherein the control means waits the elapse of a predetermined delay time before starting the operation of detecting packet errors by the error detection means after changing the reception signal input to the demodulation means by the input means.

9. The apparatus according to claim 6, wherein the control means differentiates the threshold value in a state where the probability of being selected is high and the threshold value in a state where the probability of being selected is low and controls the switching operation by providing the transition of state with hysteresis.

10. The apparatus according to claim 1, wherein the reception signal is a digital broadcast signal containing pilot signals, and the control means performs a switching control operation of comparing the modulation error ratio (MER) before the switching control operation and the modulation error ratio (MER) after the switching control operation and selecting the reception signal in a better signal receiving condition.

11. The apparatus according to claim 10, wherein the control means performs a switch control operation of comparing the modulation error ratio (MER) before the switching control operation and the modulation error ratio (MER) after the switching control operation according to the carrier wave of pilot signals and selecting the reception signal in a better signal receiving condition.

12. The apparatus according to claim 10, wherein the control means waits the elapse of a predetermined period of time after switching the setting and before acquiring the post-switching modulation error ratio.

13. The apparatus according to claim 10, wherein the control means performs a switch control operation in such a way that it selects all the states after selecting a channel and then the state that shows the best modulation error ratio (MER).

14. The apparatus according to claim 13, wherein the control means searches for the state having the highest probability of being selected.

15. A reception terminal apparatus comprising:

an input section that selectively inputs a reception signal from reception signals of a plurality of types in different states of reception;

a definition section for defining a separate threshold value for each of a plurality of matching circuits corresponding to antennas, the plurality of matching circuits being used to match impedances of the antennas;

a selection section that selects a first matching circuit out of a plurality of matching circuits corresponding to a particular antenna according to input characteristics of the reception signal, and an impedance of the particular antenna;

a demodulation section that demodulates the reception signal input by the input section;

an error detection section that detects errors in the stream data obtained by the demodulation section;

a control section that determines if the number of errors as detected by the error detection section exceeds a threshold value corresponding to the first matching circuit; and a switching section for switching from the first matching circuit to a second matching circuit having a higher threshold value when the number of errors exceeds the threshold value defined for the first matching circuit.

\* \* \* \* \*